United States Patent [19]

Stewart

[11] Patent Number: 4,583,562
[45] Date of Patent: Apr. 22, 1986

[54] METHOD OF TESTING HAIR STRANDS USING KIT

[76] Inventor: Elliott B. Stewart, 8326 Main St., Kinsman, Ohio 44428

[21] Appl. No.: 560,929

[22] Filed: Dec. 12, 1983

[51] Int. Cl.$^4$ .................. A45D 40/00; G09B 19/10
[52] U.S. Cl. .................................... 132/9; 132/1 R; 132/79 R; 434/94
[58] Field of Search ............. 132/1 R, 7, 9, 45 R, 132/45 A, 45 B, 79 A, 79 R, 88.5, 88.7, DIG. 3; 434/94, 99, 100, 367, 377, 371, 395

[56] References Cited

U.S. PATENT DOCUMENTS

| | | | |
|---|---|---|---|
| 3,458,943 | 8/1969 | Trowbridge | 434/94 |
| 3,609,886 | 10/1971 | Vien | 434/99 |
| 4,224,745 | 9/1980 | Hubbard | 434/94 |
| 4,370,137 | 1/1983 | Herzig et al. | 434/94 |
| 4,403,962 | 9/1983 | LaVista | 434/94 |

*Primary Examiner*—Gene Mancene
*Assistant Examiner*—Carolyn Harrison

[57] ABSTRACT

A method of testing a plurality of hair strands (locks) with chemical formulations, either with cut and taped (at root end) hair strands, or with hair strands wrapped on a rod or roller, securely fastened in the clip of a small folding clipboard Tester, comprising a clip at the top of a dark colored inside back surface of Tester for testing, examining and comparing hair strand samples, and a vertically hinged light colored front, for when this light color facilitates examination; there being ½ inch space between clip and cover to lift strands onto cover while still fastened in clip. Keeping records of the multiple strands, clients, tests, products, formulations, timings, desires and results involving a complete multiple Hair Test Record Card, its reverse side having a release or waiver; which is incorporated in a transparent pocket on the inside back of the cover, which also has a small identification card and pocket for student or owner. A pen or pencil holder, and VELCRO pads to fasten Tester open are incorporated to protect cards when washing hair strands at sink faucet, or client is reading and signing release in clip. Testing may involve coloring, bleaching or dye removing; or hair relaxing, straightening and permanent waving with test rod or roller. Some tests require that strands be warmed or blow dried; so the work area below the clip is constructed of a laminate, which is resistant to 160° F. temperature so that blow drying does not swell and deform the plastic covering.

4 Claims, 4 Drawing Figures

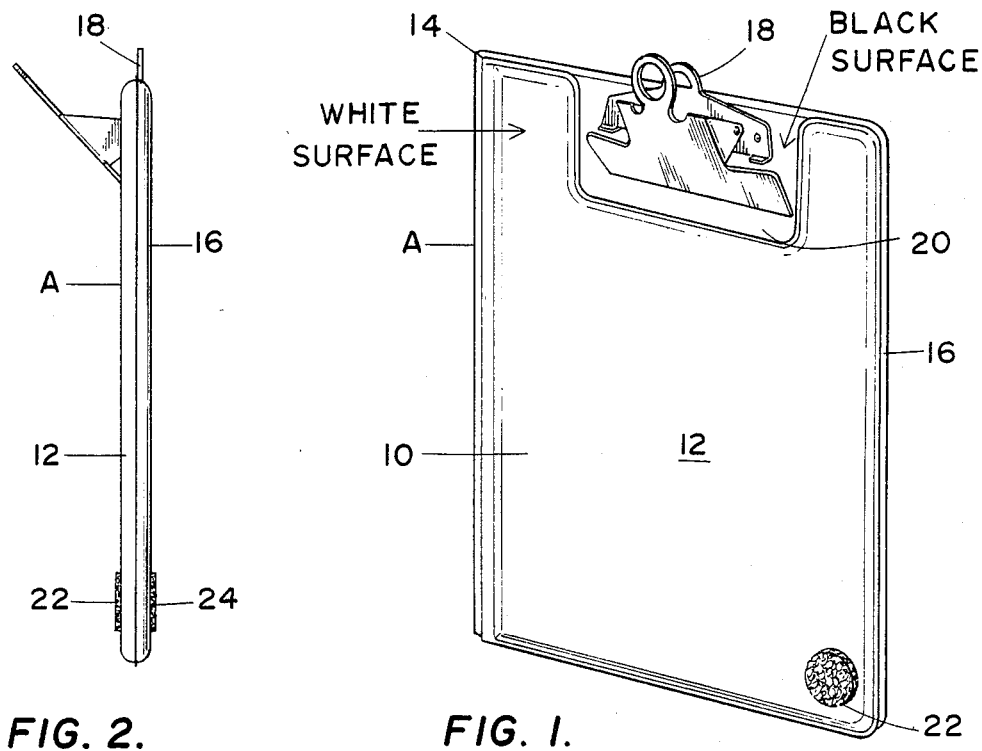
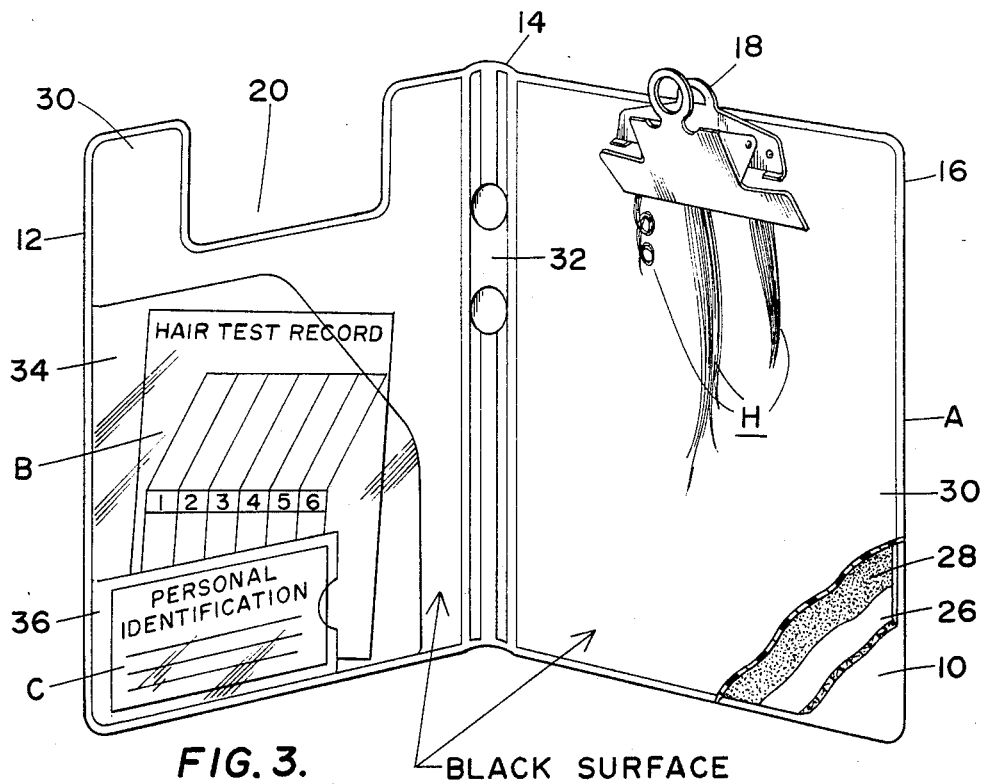

METHOD OF TESTING HAIR STRANDS USING KIT

BACKGROUND OF THE INVENTION

1. Field of the Invention

The present invention pertains to a method of testing one or several hair strands (locks) for color, curl or condition, prior to whole head application of treatment. Various products and chemical treatments to alter hair color or curl are applied to the strands, timed, cleaned off or neutralized, and some are dried, usually with a blow dryer. During and after these strand tests; timing, color, curl, texture, condition, and relaxing or straightening are observed visually and digitally, to learn strength of hair and correct timing and strength of product to avoid excessive hair damage; and subject of treatment may enter into choices when appropriate.

This may be used by hairstylists, chemists or technicians, and when simplified by the general public.

The present invention utilizes a Hair Strand Test Kit with a Hair Strand Tester incorporating improvements on prior art.

In the testing of hair samples by hairstylists and others for color, curl or damage resulting from application of various chemical products, it is common practice to test a small portion of hair on the head; or to scissor a small quantity of hair from the head, tape or fasten the cut ends to foil, card or similar product, and apply a small amount of the formulation to be tested, preliminary to complete head application.

In spite of the very great importance of these tests to the client's hair health and personal desires, they are infrequently given due to time, and difficulty in handling the hair sample while giving the tests and then recording the test results. Experienced operators become much in demand by the public, since fewer mistakes in judgment may be expected, for insufficient experience or knowledge in general in the industry.

At times such hair samples are mailed by cosmetologists and others to product manufacturers, for their technicians or chemists to analyze and test in a similar manner.

Other things tested for besides color, include various hair diseases and general hair condition or health, such as texture, elasticity and porosity; particularly after a chemical treatment, to ascertain the degree of damage or breakage. Previously broken down or damaged hair that has been bleached by natural or chemical means, given permanent hair coloring treatment, or a permanent wave treatment, are especially subject to damage or breakage, if too strong a formula or product is used; or there is too long a timing in treatment application.

These hair tests can also be very important because some chemicals used are incompatible with others used for similar purposes in the salons, and also in home treatments by the clients, often without specific knowledge of product by the hairstylists or client. Physical reactions of these incompatible chemicals include hair damage, splitting and breakage, as well as odd colorations.

A similar system of testing hair samples is in common practice to test hair straighteners and relaxers. These chemical products are used where hair is naturally curly, but straight, or larger diameter curls are desired. Fewer hairs are commonly tested, one hair and foil, or a few hairs from various points of the scalp. Besides testing for product ability to straighten hair, like results as above, again are tested for; general texture, elasticity and porosity and to ascertain any damage or breakage, and guides to determine correct timing or product strength to be used on the patron's hair.

The handling of small numbers of hair on foil or card, and the required operations of product application, cleaning, washing, shampooing or neutralizing, drying and inspection or examination are now quite tedious; as well as, the problem of keeping track of the different hair samples, formulations, products, clients and timings. Due to these difficulties, these tests are seldom performed now, and when performed usually only one strand is tested, unless a problem or damage has already presented itself, thus having lost its primary effectiveness. The samples are not now usually shown to the patrons when they are taken because of poor appearance, so more than one is seldom taken for patrons choice when color is involved in the test.

It is common practice where special mechanical or scientific equipment has been obtained to stretch and test one or two hairs for elasticity, strength or condition; or where computer equipment has been obtained to fasten a clip onto a lock of hair on the head and test for condition or strength. Such tests are incomplete and give only a general idea of hair condition, and results that may be achieved. It requires more than one or two hairs be tested because of the naturally wide variety of hair diameters from any given head; and that both ends and body length of hair be tested separately because of normal abuse and prior chemical treatments. There is no substitute for testing a quanity of that particular client's hair, with that particular product to be used, to learn results. All representations or pictures of what a certain product or treatment will do to hair are at best vague approximations, depending on many variables and commonly requiring corrections. Everyone's hair strength and inherent hair color is different to start, has been abused differently and is of varied resistance to chemicals; and everyone's hair has different color pigments and the difficulty in their removal or covering varies, particularly when previously chemically treated.

The method here presented not only helps the student or hairstylist more quickly learn their trade, but may readily involve the client in choice of color desired. More importantly it keeps student or hairstylist from making a mistake in treatment, protecting both operator and client, especially from poor chemical reactions to hair or scalp.

2. Description of the Prior Article Art

The prior art used in this example of the invention, commonly referred to as a small folding clipboard, is commonly made of thin plastic covered chipboard, heat sealed and vertically hinged at the center to fold. Centrally riveted to the right back half when open is a spring metal clip as a means to fasten a pad of paper, forms or sheets of paper; and the front or cover has a cut out section to avoid the clip, enabling the cover to hinge flatly closed. On the inside or back of the front or cover a pocket is commonly placed to hold papers, and a loop to hold a pen or pencil. The plastic is commonly produced with a smooth or rough texture in many colors, one texture and color commonly used throughout. Each of many manufacturers using various clips and dies.

SUMMARY OF THE INVENTION

The present invention solves the problem of testing a particular client's hair with a particular product or formulation before whole head application, and at the same time testing the results achievable with variations of product or formulation; and may also be used for comparing the same formulation on different client's hair types. It also solves the problem of recording all of the pertinent test information of these 1 to 6 hair strands taken with scissors or razor—as identification, date, desires, product, formulation, timing and condition; and particularly the problem of viewing either light or dark colored hair for inspection, using light or dark surface of tester, whichever background shows the hair to best advantage. Handling the hair strands is done easily by Scotch taping the cut end or ends together and fastening in clip on inside dark surface which is resistant to chemical staining, abrasion, moisture and heat to 160° F. temperature when drying the treated hair samples. Examining the hair for damage is greatly enhanced by using the correct contrast background and being securely fastened for visual and digital testing of texture, elasticity and porosity; which is done by rippling and pulling with the fingers. The timing to attain desired results becomes apparent, and is enhanced by more than one sample. An extra sample strand may be taken and left untreated for comparison. The patron is not made to wait, as with tests given on the head, for testing can be done during free time.

Several hair strands can be tested after an initial client visit for permanent coloring, since a patch test must be given (by law) 24 hours before treatment, to test for allergic or sensitive reaction of the scalp, giving a full day for hair strand tests to be performed. Hair strand samples may also be taken for testing on a current appointment, for a later appointment, when client is shown samples and brought into the choice of color desired, informed of hair maintenance and cautioned of possible personal idiosyncrasies that may not show up from a patch test, with a release or waiver read and signed because of this, or illness, incapacity, incompetency or parental permission; as well as when an unknown chemical compound has been previously used.

A similar procedure is followed for straighteners or relaxers where a patch test is required, however, the Hair Strand Tester is an improvement in testing for correct product strength, timing and damage for immediate use when a patch test is not needed.

An ID card for student or owner in a small inside pocket, and replaceable pink Hair Test Record cards are included in a large folding clipboard pocket, with a place for all the hair test records, including the patch test or tests, on one side of card, and a Release or Waiver on the reverse side, which may be filed separately or reused on other clients; along with a pen or pencil in holder on clipboard. Students in a cosmetology school might use a pencil, and reuse the Hair Test Record cards by erasure, since they might not have a card file. Most hair styling businesses would use a pen and file the patron's record cards permanently for reference.

The ease with which hair strands may be warmed and tested makes it possible to also test hair and certain permanent wave lotions for curl, timing and damage, where other means are not plausible because of the necessity of low heat being applied to hair for certain processes to activate. This may be done immediately before treatment of patron's hair, or for a following appointment. Operators may use a generally available test rod or roller and fasten rod or roller in clip wrapped in foil.

The ability to take a number of hair strand tests at once from one individual, and compare the results, using different brands, products, formulations and timing; as well as, taking strands from several individuals with different hair types, strengths, porosity and color, and compare the results with the same formulation; makes using the Hair Strand Tester Kit an unexcelled learning technique and the quickest way of learn haircoloring for the student, technician, barber or beautician; and they may quickly become proficient at coloring hair, or straightening, relaxing and giving correct strength permanent waves.

Fractional measuring spoons may be included in the kit for ease in mixing small quantities of product formula.

By using a larger cutout in the cover, the article invention facilitates lifting hair strands from the dark inside work surface, to the light outside cover surface when examination is improved by its contrast to the hair strand color.

The dark inside work surface is covered with a smooth dark plastic to facilitate cleaning and to avoid stain discoloration; as well as facilitate examination of light colored hair strands.

The top working surface of the back under the clip is constructed of a special heat resistant laminate. A clear polyester carrier with an acrylic based adhesive on both sides, resistant to plasticizers and 220° F. temperature is sandwiched between the black plastic cover and the heavy (125 pt.) hard faced cardboard; then edges of the black plastic cover and whte plastic back are heat sealed at their edges. Generally plastic which will heat seal easily will deform at hair dryer temperatures. The 6×9 inch small folding clipboard Tester will rest easily at the opening in a whole head hair dryer when processing a heat permanent wave sample test, but when drying a processed and washed sample with a hand held blow dryer, heat may reach 160° F. being in close proximity to Tester.

The light colored outside plastic covering is made of textured plastic to improve overall appearance, and facilitate the hair strand color examination when its background color contrast improves viewing.

A clip is used having a means of hanging Hair Strand Tester when desired in testing or storage, and hook and loop pads or coins are conveniently placed to fasten clipboard open when either testing or giving clipboard to client to examine or compare hair samples; or to read and sign release or waiver card, which is then fastened in the tester clip. The clean neat appearance in its entirety welcomes presentation of strand samples to client for color comparison, viewing and choice; adding to professionalism, and informing and reassuring both operator and client, and so lowering apprehension in both operator and client.

Fastening Tester fully open with hook and loop coins makes it easy to hold and manipulate Tester in one hand, while the other hand can manipulate hair strands or foil and apply product, neutralize, treat, clean or shampoo strands under sink faucet or dry, while Record Cards are protected.

BRIEF DESCRIPTION OF THE DRAWINGS

FIG. 1 is a perspective view of the Hair Strand Tester from the front or top. A specialized small folding clipboard showing the necessary space between lower extremity of clip and aperture in cover or top, and the hook portion of a hook and loop coin. The front and back (top and bottom) are white to contrast with the inner black surface and certain colors of hair samples.

FIG. 2 is an edge view from opening right side of the article of the present invention, showing the hook and loop pads and the front extention and upper hanging portion of spring metal clip.

FIG. 3 is a perspective view of the article of the present invention opened, showing the black inside reverse side of cover and work surface of back, with taped hair strands in clip; and pen or pencil holder at hinge; and transparent pocket for Hair Test Record (one side) and Release or Waiver (reverse side) of red cards, with small transparent pocket for identification card of student or owner. A cutaway view is shown of lamination and separate outside back cover.

DETAILED DESCRIPTION OF A PREFERRED EMBODIMENT OF KIT

Figure 4:
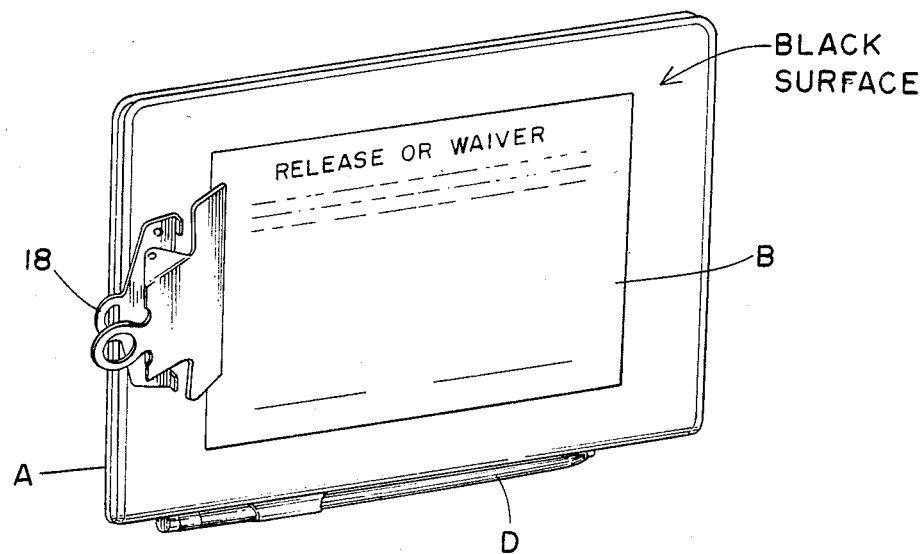
FIG. 4 is a perspective view of the article of the present invention fastened open with hook and loop coins, as it would be to hide and protect directions and cards when treating hair strands; or to present Release or Waiver to client with pen, to read and sign, with card fastened by its side in clip.

With reference to the drawings in which like reference characters designate like or corresponding parts throughout the various views, and with particular reference to FIG. 1, the article for use in testing cut and taped hair strand samples is designated generally at A and is folded closed, being a folding clipboard of approximately 6×9 inches, presenting the top white surface 10 of the cover 12, a rectangular sheet of pliable plastic material commercially available of a good grade (0.015 ga.) cool white suedene vinyl plastic composing the top of cover 10, outside of hinge 14, and bottom of back 16, where it is imprinted with the name Hair Strand Tester; its many uses; instructions to quickly become proficient at coloring; to test and caution client; and directions for use and care; etc. This covering is heat sealed to the inside covering around the edges and through most of the hinge 14.

The metal clip 18 riveted centrally at the top of the front inside surface of the back 16, is seen through the aperture 20 in the top cover, which has a lower clearance from the lower extremity of clip of approximately ½ inch.

To fasten article A open, the black hook pad 22 is shown of a hook and loop coin.

FIG. 2 is an edge view from the opening right side of article A showing front cover 12 and back 16 with side view of clip 18 showing front extension and upper back portion of clip for hanging. To fasten article A open both black hook pad 22, and black loop pad 24 are shown of the hook and loop coins.

FIG. 3 illustrates article A opened, exposing inside of cover 12, hinge 14 and work surface of back 16, composed of a rectangular sheet of pliable (0.015 ga.) black smooth plastic sheet 30. The cover 12 is composed of a rectangular piece of heavy (125 pt.) hard faced cardboard 26 with an aperture 20, overlaid on top with white plastic 10 and on the inside with black plastic 30, all edges narrowly heat sealed around the cardboard.

The back 16 of article A with the clip 18 riveted at the top center is composed of a lamination (as illustrated in cutaway view) and the white plastic sheet 10. The lamination is composed of a rectangular piece of heavy (125 pt.) hard faced cardboard 26; a sheet of double coated acrylic based adhesive on a polyester carrier 28, resistant to plasticizers and 220° F. temperature; and the inside sheet of black plastic 30, rolled together with pressure to give good adhesion between layered materials without air bubbles, buckling or lacerations. The two sheets of plastic 30 and 10 are heat sealed narrowly around the edges of the cardboard. This assembly stops black plastic sheet from rippling if exposed to 160° F. temperature when hair strands H are blow dried.

The hinge 14 is formed of the outside white sheet of plastic 10, and the inside black sheet of plastic 30, heat sealed together narrowly at cardboard edges, with over ½ inch width of center hinge unsealed in upper portion to form a pen or pencil holder 32. Two ½ inch holes are punched through the black vinyl inside sheet, on centers 1½ inches apart, the balance of the hinge is heat sealed.

A transparent plastic sheet pocket 34 on the inside back surface of the cover 12, holds multiple hair test record cards B, which include a release or waiver on the reverse side. Heat sealed to pocket 34 and inside cover 30 is a small transparent pocket for blank identification card for student or owner.

In reference to FIG. 4 article A is shown fastened open by closure of hook and loop pads 22 and 24 as it would be during testing of hair strand samples H, to protect cards B and C in pockets 34 and 36 from faucet water and hiding imprinting on the bottom of back 16. The reverse side of Hair Test Record card B, the release or waiver side up, is fastened by edge in clip 18 for client to read and sign when appropriate, preliminary to starting treatment. A pen D is handed to client along with card B in clip 18 of tester A.

Having described a Summary and Preferred Embodiment of the Articles what is claimed is:

1. A method of testing multiple hair strands for coloring, color removing, bleaching, straightening and curling, testing the hair strands' condition before, during and after said tests including elasticity, porosity, strength, and texture of the hair strands, testing hair treatment products for use and compatability to the hair strands before treating the subject's full head of hair, said method utilizing a hinged two-piece rectangular clip board comprising an upper and a lower panel having dark colored surfaces on the inner sides and light colored surfaces on the opposite outer sides thereof, pockets of transparent material on the inner dark colored surface of the upper panel and a spring clip on the inner dark colored surface of the lower panel, a rectangular aperture in the upper panel commensurate in size and location to that of said clip enabling said upper panel to lie flatly in closed position against said lower panel such that said inner dark colored surfaces of each panel face each other, a pair of oppositely disposed spaced VELCRO pads secured in registrable relation to one another on said light colored surfaces, whereby said method comprises the steps of opening said clip board, securing said multiple hair strands in said clip on said dark colored surface of said lower panel, treating said multiple strands with chemical formulations of hair treatment products, leaving one of said hair strands untreated for comparison, and to facilitate inspection relocating said hair strands by flexing the free ends thereof onto said light colored surface of said upper panel while said hair strands are still secured in said clip and said panels are in said closed position.

2. The method of testing of multiple hair strands of claim 1 wherein the comparison of the hair strands comprises comparing and analyzing for color, straightening, timing, and curling, hair inspection for damage by manual, mechanical, and visual inspection.

3. The method of testing of multiple hair strands of claim 1 wherein a multiple record card is made identifying each of the hair strands, treatments, condition and testing results of same.

4. The method of testing of multiple hair strands of claim 1 wherein the hair strands to be tested are placed on rods to establish condition of the hair strands as will be well understood by those skilled in the art.

* * * * *